United States Patent [19]

Hayashi et al.

[11] 3,778,793

[45] Dec. 11, 1973

[54] CLOCKING SYSTEM FOR MAGNETIC MEMORY

[75] Inventors: Yukitaka Hayashi; Akira Osawa; Hakuichi Shimizu; Nagaharu Hamada, all of Hitachi, Japan

[73] Assignee: Hitachi, Ltd., Tokyo, Japan

[22] Filed: Sept. 11, 1972

[21] Appl. No.: 287,639

[52] U.S. Cl. .......................................... 340/174.1 A

[51] Int. Cl. ............................................ G11b 5/00

[58] Field of Search .............. 340/174.1 A, 174.1 B, 340/174.1 H, 174.1 G

[56] References Cited

UNITED STATES PATENTS 3,609,560 9/1971 Greenberg .................. 340/174.1 A 3,731,220 5/1973 Besenfelder ................ 340/174.1 A

*Primary Examiner*—Vincent P. Canney
*Attorney*—Paul M. Craig, Jr. et al.

[57] ABSTRACT

A clocking system for a magnetic memory in which a signal obtained by multiplying the frequency of a fixed clock signal by a factor of $n$ is applied to a variable scale counter operating normally as a scale-of-$n$-counter, and an output appearing from a specific bit position of this counter is used as a synchronizing clock signal. The counter is operated as a scale-of-($n-1$) or scale-of-($n+1$) counter during the correction of the phase of the clock signal so that the phase of the clock signal can be satisfactorily corrected with suitable inertia regardless of whether the correction is carried out in a sector gap or in a sector.

5 Claims, 4 Drawing Figures

CLOCKING SYSTEM FOR MAGNETIC MEMORY

BACKGROUND OF THE INVENTION

1. Field of the Invention

This invention relates to a clocking system for a magnetic memory.

2. Description of the Prior Art

In a magnetic memory having a high packing density of, for example, 1,000 to 2,000 bits per inch, the phase of a data signal read out from a data track deviates generally greatly from the phase of a so-called fixed clock signal read out from a timing track due to factors such as expansion, contraction and distortion of the magnetic head and magnetic surface owing to the fact that the temperature during writing is not equal to the temperature during reading. Practically, the phase of the data signal may deviate from the phase of the clock signal by 2 to 3 bits. Due to the fact that the phase difference varies depending on the individual tracks or on the positions even in the same track, it is almost impossible to reproduce correct data by clocking the data signal read out from the data track by the fixed clock signal. It has therefore been common practice to employ a self-clocking method in which a clock signal which is completely in phase with a data signal being read out is extracted from the data signal for the purpose of clocking the data signal.

The self-clocking recording method includes phase modulation (PM) and frequency modulation (FM). However, these PM and FM methods are disadvantageous for use with a memory having a high packing density compared with the NRZ method in that the maximum number of magnetization reversal per bit in the former is two times that in the latter.

On other other hand, the NRZ method is disadvantageous in that the timing signal cannot be obtained for each individual data bit. To overcome the above disadvantage, a method has been proposed in which $n$ channel clock signals which are out of phase by $1/n$ bit time from one another are produced by multiplying the frequency of a fixed clock signal by a factor of n and the channel clock signal having a smallest phase difference from the data signal being read out is selected to be used as the clock signal. According to this method, plrior to read-out of a series of data blocks recorded on regions called sectors, a signal of several or tens of synchronizing bits read out from a region called a sector gap is used to select the channel clock signal which is employed for clocking in the sector following the sector gap.

As is commonly known, the method of selection includes selecting the channel clock signal by use of a single synchronizing bit and selecting the channel clock signal on the basis of the principle of decision by majority by use of a plurality of synchronizing bits. The former has been efective in that synchronization is attained without any inertia and the presence of waveform distortion or the like in the synchronizing bit may result in the selection of a channel clock signal which is not always in exact synchronism with the data signal, thereby remarkably reducing the read-out margin of the succeeding sector. While the latter overcomes the defect of the former, it has been defective in that a complex logic circuit for the majority decision is required. The greatest defect of these methods resides in the fact that, when a relatively large number of data are included in one sector as when data occupy a range greater than about 1/100 of the circumference, the channel clock signal selected to be in synchronism with the data signal in the sector gap would not be commonly in synchronism with the data signal at the end of the succeeding sector.

In a method based on the prior art PM or FM technique for use with a magnetic memory having a high packing density, a variable frequency oscillator having relatively large inertia is synchronized with a data signal in order to avoid an undesirable reduction in the phase margin due to a peak shift or waveform distortion. According to this method, out of synchronism would not occur at the end of a sector since synchronization is carried out in every sector and sector gap. However, the use of the variable frequency oscillator having relatively large inertia requires tens to hundreds of synchronizing bits in the sector gap, resulting in a remarkable reduction in the rate of utilization of the magnetic surface especially in a magnetic memory having a relatively large number of sectors. Further, the greatest defect of this method resides in the fact that it is not applicable to a memory of the NRZ recording type in which the timing signal cannot be obtained for each individual bit. This defect has been one of the great blocks to high packing densities.

SUMMARY OF THE INVENTION

It is an object of the present invention to provide a clocking system suitable for application to a magnetic memory of the NRZ recording type having a high packing density.

Another object of the present invention is to provide a clocking system for a magnetic memory having a high packing density so as to ensure stable synchronization in spite of the fact that the sector gap for synchronization is smaller than heretofore.

A further object of the present invention is to provide a novel clocking system for satisfactorily clocking a magnetic memory having a high packing density in spite of simple circuitry.

The present invention is featured by the fact that the phase of a clock signal used in reproduction of data from a memory of the NRZ recording type is corrected with inertia so that the correction of the phase can be done in the sector gap as well as in the sector when so required.

Another feature of the present invention resides in the fact that the inertia is variable during the correction of the phase of the clock signal.

A further feature of the present invention resides in the fact that a signal obtained by multiplying the frequency of a fixed clock signal by a factor of n is applied to a variable scale counter operating normally as a scale-of-n counter so as to obtain a synchronizing clock signal from a specific bit position of the counter, and the counter is operated as a scale-of-($n-1$) or scale-of-($n+1$) counter during the correction of the phase of the clock signal.

BREIF DESCRIPTION OF THE DRAWING

DESCRIPTION OF THE PREFERRED EMBODIMENTS

Figure 1:
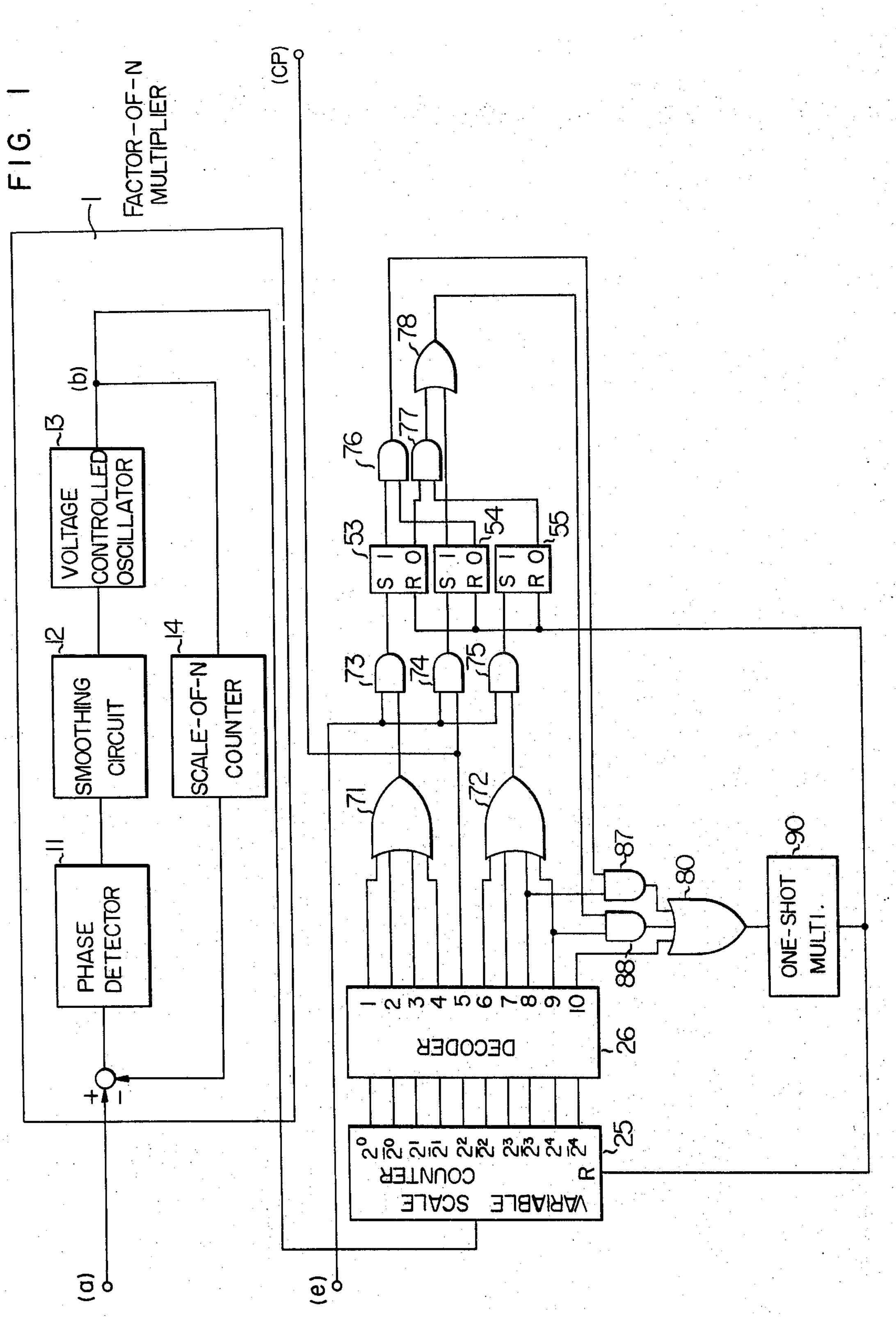
FIG. 1 is a circuit diagram of an embodiment of the present invention.
Figure 2:
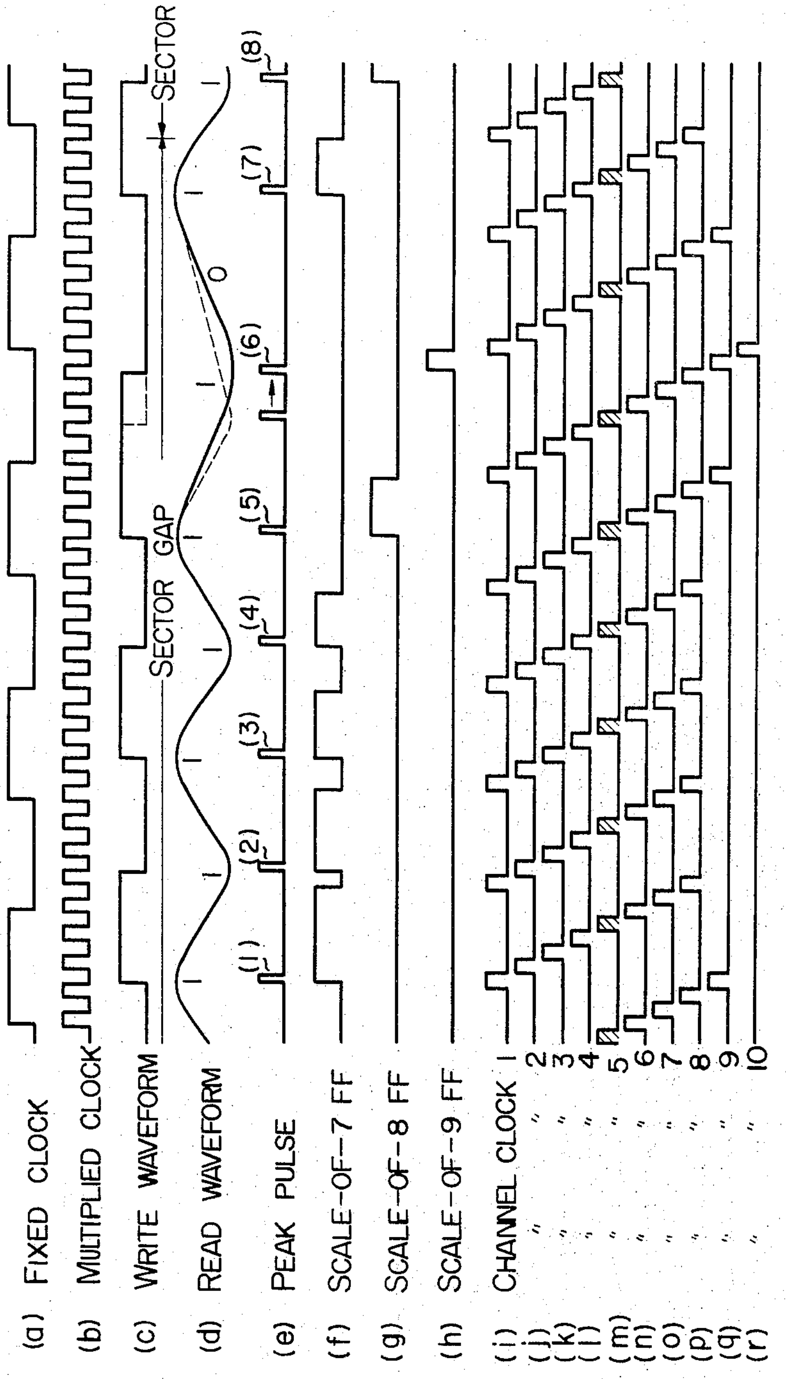
FIG. 2 is a time chart illustrating the operation of the system shown in FIG. 1.

FIG. 1 is a circuit diagram of an embodiment of the present invention, and FIG. 2 is a time chart illustrating the operation of the system shown in FIG. 1.

The time chart shown in FIG. 2 will be described for convenience of explanation with reference to a so-called NRZ-I recording method which is an improvement over the NRZ method and in which inversion of magnetization corresponds to information 1. FIGS. 2*a*, 2*b*, 2*c*, 2*d* and 2*e* show the waveforms of a fixed clock signal, a clock signal obtained by multiplying the frequency of the fixed clock signal by a factor of 8, a write-in signal, a read-out signal, and a peak pulse signal obtained by detecting the peaks of the read-out signal, respectively.

The phase difference between the fixed clock signal shown in FIG. 2*a* and the write-in waveform shown in FIG. 2*c* is ordinarily constant, and the phase difference between the fixed clock signal shown in FIG. 2*a* and the peak pulse signal shown in FIG. 2*e* obtained by detecting the peaks of the read-out waveform shown in FIG. 2*d* should also be constant. However, this latter phase difference varies remarkably depending on individual data tracks or various positions in the data tracks due to factors such as expansion, contraction and distortion of magnetic heads and a magnetic memory such as a magnetic drum. Therefore, the fixed clock signal shown in FIG. 2*a* cannot be used in that form for the reproduction of correct data from the peak pulse signal shown in FIG. 2*e* and it is necessary to produce by some suitable means a clock signal which is in synchronism with the peak pulse signal shown in FIG. 2*e*.

FIG. 1 shows a preferred system according to the present invention which meets the above demand. Referring to FIG. 1, a factor-of-*n* multiplier 1 multiplies the frequency of the fixed clock signal shown in FIG. 2*a* by a factor of *n*. In FIG. 1, n is selected to be $n = 8$ for convenience of explanation. The factor-of-*n* multiplier 1 is composed of a phase detector 11, a smoothing circuit 12, a voltage controlled oscillator 13 and a scale-of-*n* counter 14. In the multiplier 1, the frequency of the output waveform (b) obtained by multiplying the frequency of the fixed clock signal (a) by the factor of *n* is divided into $1/n$ by the scale-of-*n* counter 14, and the phase difference between the output of the scale-of-*n* counter 14 and the fixed clock signal (a) is detected by the phase detector 11. The output of the phase detector 11 is smoothed by the smoothing circuit 12 and is then applied to the voltage controlled oscillator 13 to control the oscillator 13. The output (b) of the voltage controlled oscillator 13 is substantially in phase with the fixed clock signal (a) and has a frequency which is n times that of the fixed clock signal (a). Such a factor-of-*n* multiplier is well known in the art and any detailed description of the operation thereof is unnecessary.

A variable scale counter 25 operates as a scale-of-$(n-1)$ counter or a scale-of-$(n+1)$ counter when the timing with which a resetting signal is applied to the resetting terminal R is suitably controlled. It is supposed for convenience of explanation that the content of the counter 25 is $2^0 = 1$ in the reset state of this counter 25 and 1 is successively counted in response to the application of the successive pulses of the clock signal (b) which is multiplied by a factor of 8. A decoder 26 decodes the output of the counter 25 thereby delivering channel clock signals 1 to 10 shown in FIGS. 2*i* to 2*r* respectively.

The channel clock signals 1 to 4 are applied through an OR gate 71 to one of the input terminals of an AND gate 73 so that, when the timing of one of the channel clock signals 1 to 4 coincides with the timing of the peak pulse signal (e), an output appears from the AND gate 73 to set a flip-flop 53. The channel clock signal 5 is directly applied to one of the input terminals of an AND gate 74 so that, when the timing of the channel clock signal 5 coincides with the timing of the peak pulse signal (e), an output appears from the AND gate 74 to set a flip-flop 54. The channel clock signals 6 to 9 are applied through an OR gate 72 to one of the input terminals of an AND gate 75 so that, when the timing of one of the channel clock signals 6 to 9 coincides with the timing of the peak pulse signal (e), an output appears from the AND gate 75 to set a flip-flop 55. The channel clock signals 8 and 9 ar further applied to one of the input terminals of respective AND gates 87 and 88, thence to an OR gate 80. The channel clock signal 10 is applied directly to the OR gate 80.

An output 1 of the flip-flop 53 and an output 0 of the flip-flop 54 are applied to the other input terminal of the AND gate 87 through an AND gate 76. An output 0 of the flip-flop 53 and an output 0 of the flip-flop 55 are applied to the other input terminal of the AND gate 88 through an AND gate 77 and an OR gate 78. An output 1 of the flip-flop 54 is applied to the said input terminal of the AND gate 88 through the OR gate 78. The channel clock signal 10 and outputs of the AND gates 87 and 88 are applied through the OR gate 80 to a one-shot multivibrator 90 for resetting the counter 25 and flip-flops 53, 54 and 55. The one-shot multivibrator 90 is provided for resetting the counter 25 in response to the rising edge of the channel clock signals, and the pulse width of the output of the one-shot multivibrator 90 is smaller than the pulse width of the channel clock signals and peak pulses.

With such a structure, when the timing of one of the channel clock signals 1 to 4 coincides with the timing of the peak pulse signal (e), the flip-flop 53 is set and 1 appears from the AND gate 76 to be applied to the AND gate 87. Thus, in response to the rising edge of the channel clock signal 8, the counter 25 is reset to act as a scale-of-7 counter. When the timing of the channel clock signal 5 coincides with the timing of the peak pulse signal (e), the flip-flop 54 is set and the counter 25 is reset in response to the rising edge of the channel clock signal 9 to act now as a scale-of-8 counter. When the timing of one of the channel clock signals 6 to 9 coincides with the timing of the peak pulse signal (e), the flip-flop 55 is set and the counter 25 is reset in response to the rising edge of the channel clock signal 10 to act now as a scale-of-9 counter.

The operation of the system according to the present invention will be described in more detail with reference to FIG. 2. In the present embodiment, the channel clock signal 5 (hatched portions in FIG. 2m) is used as a signal-detecting clock signal CP. Conclusively, it is intended to control the counter 25 in such a manner that synchronization between the channel clock signal 5 and the peak pulse signal (e) can be attained.

It is supposed that, in the initial condition, the flip-flops 53, 54 and 55 are in the reset state, and the counter 25 is counting the pulses in the order of the channel clock signals 5, 6 and 7. In this initial condition, the counter 25 is operating as a scale-of-8 counter by the action of the AND gate 77 and OR gate 78. Then, when the first peak pulse (1) of the peak pulse signal (e) is detected from the readout waveform (d), the OR gate 71 and AND gate 73 detect the fact that the peak pulse (1) is in synchronism with the channel clock signal 1, and thus, the flip-flop 53 is set so as to bring the phase of the channel clock signal 5 to approach the phase of the peak pulse (1). Since the flip-flop 54 is in the reset state, the output 1 of the flip-flop 53 triggers the one-shot multivibrator 90 through the AND gates 76 and 87 and OR gate 80, thereby resetting the counter 25 in response to the rising edge of the channel clock signal 8 so that the counter 25 operates now as a scale-of-7 counter. The flip-flop 53 is reset as soon as the counter 25 is reset. The second peak pulse (2) is now in synchronism with the channel clock signal 2 as the counter 25 is now operating as a scale-of-7 counter. Entirely similarly, the third and fourth peak pulses (3) and (4) are detected to be in synchronism with the channel clock signals 3 and 4 respectively and the counter 25 continues to operate as a scale-of-7 counter Then, when the fifth peak pulse 5 is detected to be in synchronism with the channel clock signal 5, it is not longer necessary to detect the relation between the peak pulses and the channel clock signals, and the flip-flop 54 is set so that the counter 25 operates now as a scale-of-8 counter.

Suppose that the sixth peak pulse (6), which is to be detected with the same time as that of the channel clock signal 5, is detected to be in synchronism with the channel clock signal 8 due to, for example, waveform distortion. (The waveform free from any distortion is shown by the broken line in FIG. 2.) In such a case, the flip-flop 55 is set by the output of the OR gate 72 and AND gate 75, and 0 appears from the AND gate 76 and OR gate 78. In response to the appearance of the pulse of the channel clock signal 10, the counter 25 is reset through the OR gate 80 and one-shot multivibrator 90 so that the counter 25 operates now as a scale-of-9 counter. No peak pulse is detected subsequently since the subsequent portion of the read-out waveform (d) is at the 0 level. In this case, the flip-flops 53 and 55 are in the reset state. In response to the rising edge of the channel clock signal 9, the counter 25 is reset through the AND gate 77, OR gate 78, AND gate 88, OR gate 80 and one-shot multivibrator 90 so that the counter 25 operates now as a scale-of-8 counter. As a result, the seventh peak pulse (7) is in synchronism with the channel clock signal 4, and the flip-flop 53 is set again. The counter 25 operates now as a scale-of-7 counter and the eighth peak pulse (8) is in synchronism with the channel clock signal 5. After the eighth peak pulse (8), the counter 25 operates continuously as a scale-of-8 counter.

FIGS. **2*f*, 2*g* and 2*h* show the set-reset states of the flip-flops 53, 54 and 55 respectively. It will be seen from FIGS. 2*f*, 2*g* and 2*h* that the flip-flops 53, 54 and 55 act to cause operation of the counter 25** as a scale-of-7 counter, scale-of-8 counter and scale-of-9 counter respectively.

It will be understood from the above description that, in the embodiment shown in FIG. 1, the frequency of the fixed clock signal is multiplied by a factor of 8 to be counted by the counter 25 and the specific channel clock signal 5 among the channel clock signals delivered from the decoder 26 is selected to be used as a clock signal. The counter 25 is operated as a scale-of-7 counter, scale-of-8 counter or scale-of-9 counter depending on the phasic relationship between the peak pulse signal (e) and the channel clock signals 1 to 10 so that the phase difference can be corrected by one-eighth bit time with each peak pulse. Thus, the phase difference can be corrected with inertia, a single waveform distortion would not cause large fluctuations of the clock signal, and no reduction in the read-out margin would occur. Further, due to the fact that the phase difference can be corrected by one-eighth bit time with each peak pulse, the phase difference can be substantially corrected by four peak pulses and a narrow sector gap may be employed. Furthermore, due to the fact that the correction of the phase difference is carried out at any positions in the sector gaps and sectors each time the peak pulse is detected, a high read-out margin can be maintained even at the end portion of an elongated sector.

Figure 3:
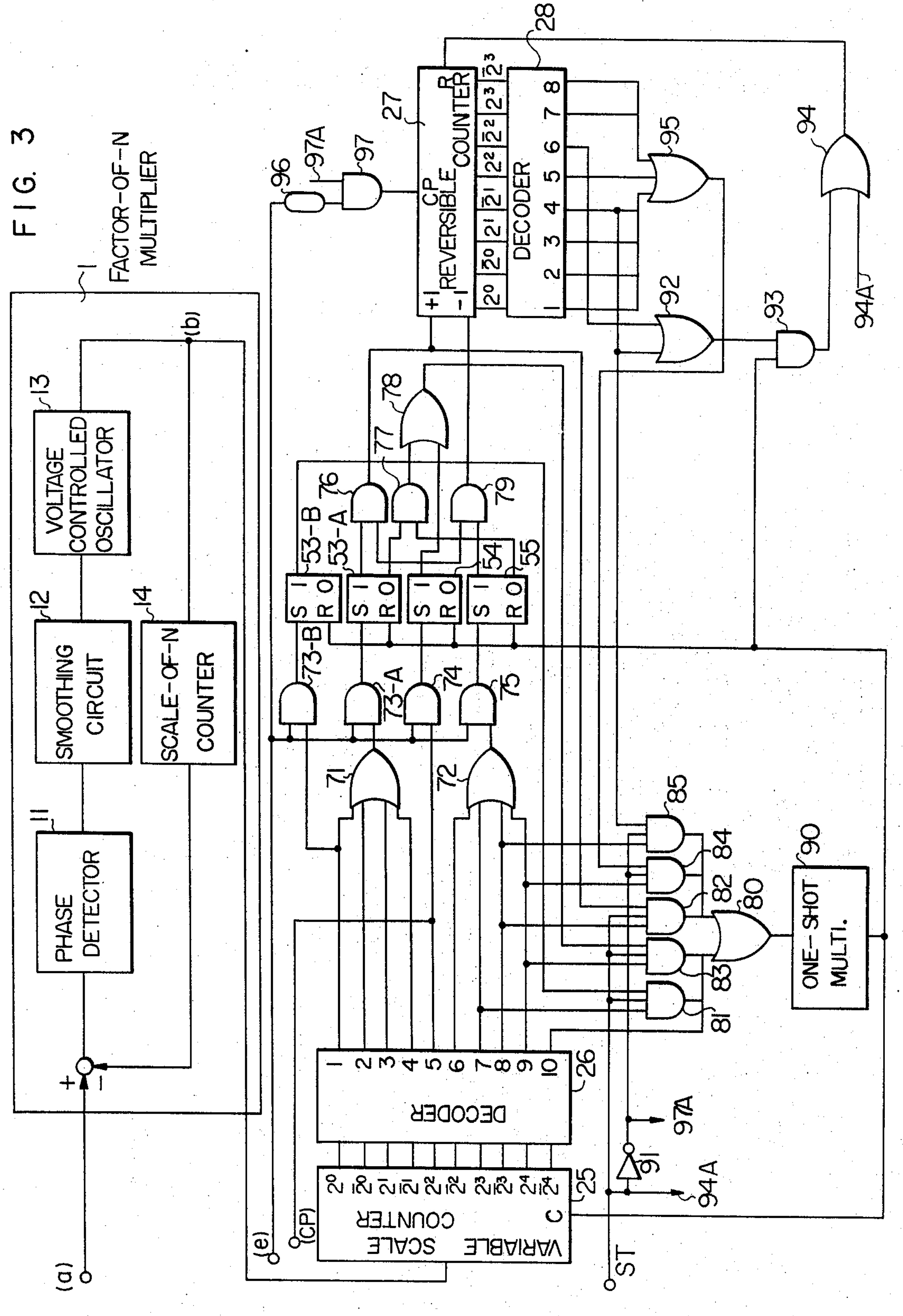
FIG. 3 is a circuit diagram of another embodiment of the present invention.
Figure 4:
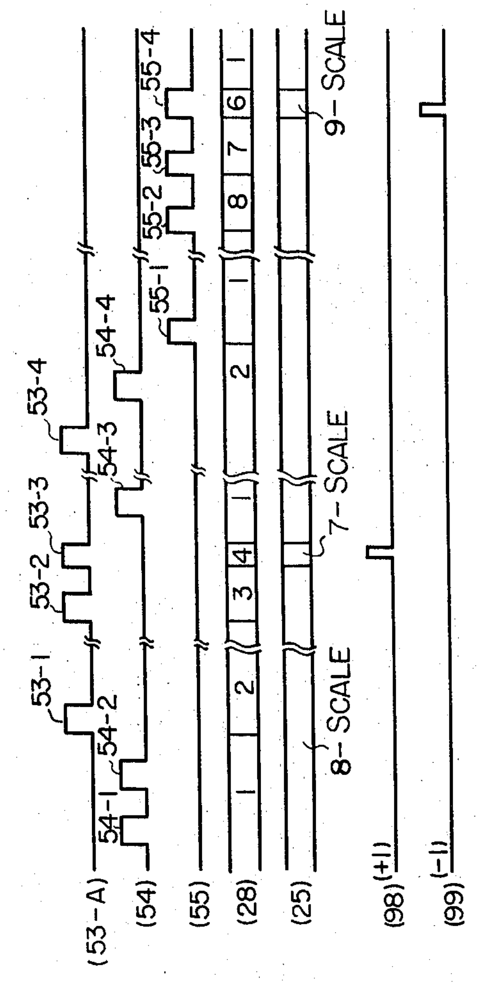
FIG. 4 is a time chart illustrating the operation of the system shown in FIG. 3.

FIG. 3 is a circuit diagram of another embodiment of the present invention, and FIG. 4 is a time chart illustrating the operation of the system shown in FIG. 3.

Referring to FIG. 3 in which like reference numerals are used to denote like parts appearing in FIG. 1, a channel clock signal is applied to AND gate 73-A through an OR gate 71 so as to set a flip-flop 53-A when the timing of a peak pulse signal (e) coincides with the timing of the channel clock signal 1. The channel clock signal 1 is also applied directly to an AND gate 73-B so as to set a flip-flop 53-B simultaneously with the setting of the flip-flop 53-A. An output 1 of the flip-flop 53-B is applied to an AND gate 81. Outputs of an AND gate 76 and an OR gate 78 are applied to respective AND gates 82 and 83. When a synchronizing timing signal ST is in its 1 level, the AND gates 81, 82 and 83 trigger a one-shot multivibrator 90 and a counter 24 is reset in response to the rising edge of channel clock signals 7, 8 and 9 so that the counter 25 can operate as a scale-of-6 counter, scale-of-7 counter and scale-of-8 counter in respective cases.

A reversible counter 27 has a +1 input terminal and a −1 input terminal. Outputs of AND gates 76 and 79 are applied to the +1 and −1 input terminals respectively of the reversible counter 27. The AND gate 79 delivers 1 when a flip-flop 54 is in the reset state and a flip-flop 55 is in the set state. The peak pulse signal (e) is applied to a clock pulse input terminal CP of the reversible counter 27 through a delay element 96 and an AND gate 97. The delay element 96 is provided for compensating the delay of a certain period of time required for the AND gates 76 and 79 to deliver their outputs after the peak pulse has been detected. The synchronizing timing signal ST is applied through an inverter 91 to one input terminal 97A of the AND gate 97. In the state in which the synchronizing timing signal ST does not appear, the reversible counter 27 counts +1 or −1 in response to the output of the AND gate 76 or 79 each time the peak pulse (e) is detected.

Outputs of the reversible counter 27 are applied to a decoder 28 which applies outputs 1, 2, 3, 4, 5, 6, 7 and 8 to an AND gate 84 through an OR gate 95. The outputs 4 and 6 of the decoder 28 are applied to an AND gate 93 through an OR gate 92 so that, in response to the appearance of the output from the one-shot multivibrator 90 for resetting the counter 25, the reversible counter 27 can be reset through an OR gate 94. The output 4 of the decoder 28 is also applied to an AND gate 85. The channel clock signals 9 and 8 are applied to the respective AND gates 84 and 85 together with the inverted signal of the synchronizing timing signal ST. In the absence of the synchronizing timing signal ST and in the presence of the output of the OR gate 95 and the output 4 of the decoder 28, the AND gates 84 and 85 trigger the one-shot multivibrator 90 through the OR gate 80 and the counter 25 is reset in response to the rising edge of the channel clock siganls 9 and 8 so that the counter 25 can operate as a scale-of-8 counter and scale-of-7 counter in respective cases.

Suppose that the synchronizing timing signal ST attains its 1 level. In this case, the reversible counter 27 is reset through the OR gate 94 due to the fact that the synchronizing timing signal ST is applied to one input terminal 94A of the OR gate 94. Further, in this case, 0 appears from the AND gate 97 which is connected to the inverter 91. Thus, no clock pulse CP is applied to the reversible counter 27 which is therefore kept in the reset state of $2^{\circ} = 1$ regardless of application of +1 or −1.

The arrangement shown in FIG. 3 is substantially similar to that shown in FIG. 1 in that the flip-flops 53-A, 54 and 55 are set and reset depending on the relation between the channel clock signals 1 to 9 and the peak pulses (e). However, in FIG. 3, the flip-flop 53-B is set and the counter 25 operates as a scale-of-6 counter as previously described when the channel clock signal 1 is in synchronism with the peak pulse signal (e). Further, in the embodiment shown in FIG. 1, the phase difference is corrected by one-eighth bit time with each peak pulse. In the case of the embodiment shown in FIG. 3, however, the phase difference is corrected by two-eighths bit time with each peak pulse when the counter 25 operates as a scale-of-6 counter. In other words, the embodiment shown in FIG. 3 is adapted to quickly respond with less inertia to a large phase difference between the clock signal and the peak pulse signal. The synchronizIng timing signal ST takes its 1 level in a portion of or throughout the entire range of the sector gap so that a large phase difference between the clock signal and the peak pulse signal within this range can be quickly corrected with less inertia.

When ST = 0, the peak pulse (e) is applied through the AND gate 97 to the clock pulse input terminal CP of the reversible counter 27 so that the reversible counter 27 counts +1 or −1 depending on the output of the AND gate 76 or 79. Until the count of the reversible counter 27 attains 3, the outputs 1, 2 and 3 of the decoder 28 are applied to the OR gate 95, and the counter 25 is operating as a scale-of-8 counter. When the count of the reversible counter 27 attains 4, the output 4 of the decoder 28 is applied to the AND gate 85, and the counter 25 is reset and operates now as a scale-of-7 counter. Since the output 4 is also applied to the AND gate 93 through the OR gate 92, the reversible counter 27 is reset as soon as the counter 25 is reset and its count is restored to 1.

Continuous application of −1 to the reversible counter 27 from the AND gate 79 varies successively the count of the reversible counter 27 from 1 to 8, 7, 6, . . . When the count is 8 or 7, the output 8 or 7 of the decoder 28 is applied to the OR gate 95 so that the counter 25 is reset to operate as a scale-of-8 counter. When the count of the reversible counter 27 attains 6 due to further application of −1, the output 6 of the decoder 28 is applied to the OR gate 92 only and the counter 25 is reset in response to the rising edge of the channel clock signal 10 so that the counter 25 operates now as a scale-of-9 counter.

In summary, the counter 25 operates ordinarily as a scale-of-8 counter after ST = 0. The counter 25 operates as a scale-of-7 or scale-of-9 counter when the count of the reversible counter 27 changes by more than 3 in the positive or negative direction as a result of successive application of +1 or −1 to the content of the reversible counter 27. The phase difference between the peak pulse signal (e) and the channel clock signal 5 is corrected by one-eighth bit time only when the counter 25 operates as a scale-of-7 of scale-of-9 counter. Thus, the correction of the phase difference in the case of ST = 0 is carried out with inertia which differs greatly from the inertia during the correction of the phase difference in the case of ST = 1. Large inertia ensures clocking which is very stable against external disturbances.

In the time chart shown in FIG. 4, it is assumed that the flip-flops 53-A, 54 and 55 are initially in the reset state, the reversible counter 27 is also in the reset state and the content thereof is $2^{\circ} = 1$, and the counter 25 is operating as a scale-of-8 counter. In FIG. 4, the set-reset states of the flip-flops 53-A, 54 and 55 are shown at (53-A), (54) and (55) respectively. The state of the output of the decoder 28 is shown at (28), and the scale of the counter 25 is shown at (25).

In the set state of the flip-flop 54 as shown by 54-1 and 54-2, 0 appears from both the AND gates 76 and 79. Thus, the count of the counter 27 is kept at 1 and the counter 25 is operating as a scale-of-8 counter. Suppose now that the timing is lost in such a case and the flip-flop 53-A is set due to the synchronization between the peak pulse signal (e) and one of the channel clock signals 1 to 4. In the arrangement shown in FIG. 1, the counter 25 operates immediately as a scale-of-7 counter in response to the setting of such a flip-flop for correcting the phase difference by one-eighth bit time. However, in the arrangement shown in FIG. 3, the count of the reversible counter 27 is merely changed to 2 and the counter 25 is operating still as a scale-of-8 counter.

Each time the flip-flop 53-A is set, 1 appears from the AND gate 76, and +1 is added to the count of the reversible counter 27 each time the peak pulse is detected. When the flip-flop 53-A is continuously set as shown by 53-1 and 53-3 in FIG. 4, the output 4 appears from the decoder 28 to be applied to the AND gate 85 as previously described. The counter 25 is reset in response to the rising edge of the channel clock signal 8 so that is operates as a scale-of-7 counter. The correction of the phase difference is not carried out until the count of the reversible counter 27 attains 4, and in this case, the phase difference is corrected by one-eighth bit time as shown at (98) in FIG. 4. The reversible counter 27 is reset as soon as the counter 25 is reset. Thus, the count of the reversible counter 27 is immediately restored to 1 again and the counter 25 operates now as a scale-of-8 counter.

Suppose that the timing is lost when the count of the reversible counter 27 is 2, and the peak pulse signal (e) is in synchronism with one of the channel clock signals 6 to 9. In such a case, the flip-flop 55 is set as shown by 55-1 in FIG. 4 and 1 appears from the AND gate 79 so that −1 is applied to the reversible counter 27 and the previous count 2 is changed to 1. The output of the decoder 28 changes merely from 2 to 1 in response to the setting of the flip-flop 55 as shown by 55-1. When, however, out of synchronization occurs continuously, the flip-flop 55 is repeatedly set and reset as shown by 55-2, 55-3 and 55-4 in FIG. 4 with the result that the output of the decoder 28 changes successively from 1 to 8, 7 and 6. When the output 6 appears from the decoder 28, this output is applied solely to the OR gate 92 and the counter 25 is reset in response to the rising edge of the channel clock signal 10 so that the counter 25 operates now as a scale-of-9 counter. Thus, the phase difference is corrected by −one-eighth bit time as shown at (99) in FIG. 4, and the reversible counter 27 is reset to 1 again.

It will be understood from the above description that, in the embodiment shown in FIG. 3, the synchronizing timing signal ST is selected to be ST = 1 so as to provide small inertia during correction of the phase difference in the sector gap, while ST is selected to be ST = 0 so as to provide large inertia during data reading in the sector. Thus, this embodiment is advantageous in that the phase difference can be quickly corrected, data reading is not substantially adversely affected by external disturbances, and stable clocking can be carried out even with a short sector gap.

As will be apparent from the foregoing description of preferred embodiments, the present invention provides the following advantages:

1. SynchronizIng pulses are not necessarily required for individual bits. Thus, the present invention is suitable for application to a magnetic memory of the NRZ recording type which is capable of recording data with high packing density.
2. Correction of out of synchronization can be carried out not only in the sector gap but also in the sector. It is therefore possible to obtain a clock signal which is sufficiently insynchronism with data even at the end of an elongated sector.
3. Out of synchronization is corrected with inertia so that the system can operate stably in spite of a peak shift due to plating scars, crosstalk, erase noises, data pattern effect and other factors.
4. Correction of the phase difference in the sector gap can be carried out with inertia which differs from inertia during correction of the phase difference in the sector. Therefore, the system can quickly respond to correct the phase difference occurring in the sector or sector gap and can operate stably against external disturbances.
5. The sector gap may be relatively short compared with the magnitude of inertia, and this provides a good rate of track utilization.
6. The phase difference can be easily corrected in spite of the simple circuitry.

We claim:

1. A clocking system for a magnetic memory in which the phase of a fixed clock signal is corrected on the basis of a peak pulse signal detected from data, comprising means for multiplying the frequency of the fixed clock signal by a factor of $n$ which is a constant, means for counting the output signal of said factor-of-$n$ multiplying means, means for decoding the count of said counting means, and means for controlling the resetting timing of said counting means so as to continuously maintain a predetermined phaSe difference between the peak pulse signal and a specific output signal of said decoding means, whereby to obtain a clock signal from the specific output signal of said decoding means.

2. A clocking system as claimed in claim 1, wherein said counting means is controlled to operate as a scale-of-($n$−1), scale-of-n or scale-of-($n$+1) counter depending on the relation between the phase of the peak pulse signal and the phase of the clock signal.

3. A clocking system as claimed in claim 2, wherein said counting means is controlled to operate as a scale-of-($n$−2) counter only when there is a great phase difference between the peak pulse signal and the clock signal.

4. A clocking system as claimed in claim 2, wherein reversible counting means is provided for the reversible counting of the number of peak pulses which are displaced in either direction in the phase from the clock signal at the time at which these peak pulses are detected, and the resetting timing of said counting means is controlled so as to provide the predetermined phase difference between the peak pulse signal and the clock signal only when the count of said reversible counting means attains a predetermined value, said reversible counting means being reset simultaneously with the resetting of said counting means.

5. A clocking system as claimed in claim 1, wherein, depending on the presence or absence of a synchronizing timing signal, (1) said counting means is controlled so as to provide the predetermined phase difference between the peak pulse signal and the clock signal each time the peak pulse is detected, or (2) said counting means is controlled so as to provide the predetermined phase difference between the peak pulse signal and the clock signal only when a predetermined value is counted by reversible counting means which carries out the reversible counting of the number of peak pulses which are displaced in either direction in the phase from the clock signal at the time at which these peak pulses are detected.

* * * * *